April 20, 1948.  J. H. GIESEN  2,439,803
SURGICAL DRILL
Filed Jan. 19, 1945    6 Sheets-Sheet 1
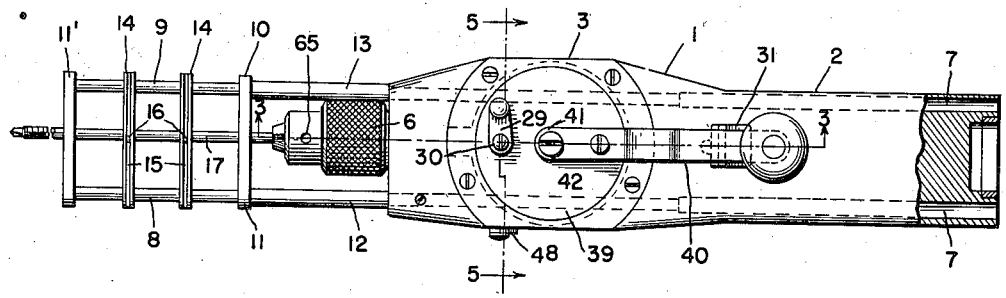
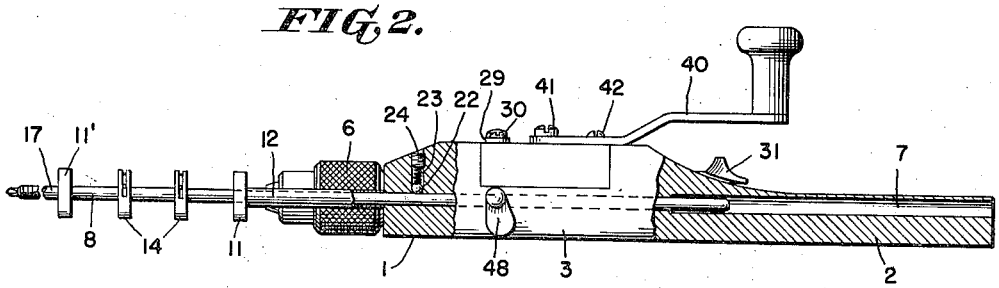
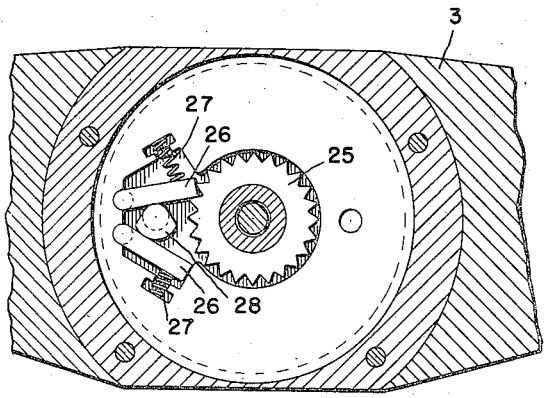
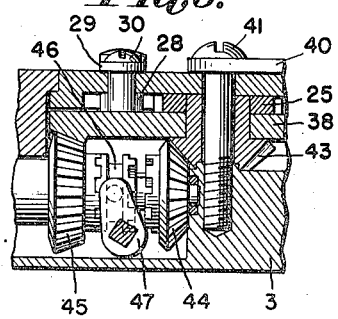
Inventor
J. H. Giesen
By P. L. Bush
Attorney April 20, 1948.  J. H. GIESEN  2,439,803
SURGICAL DRILL
Filed Jan. 19, 1945   6 Sheets-Sheet 2
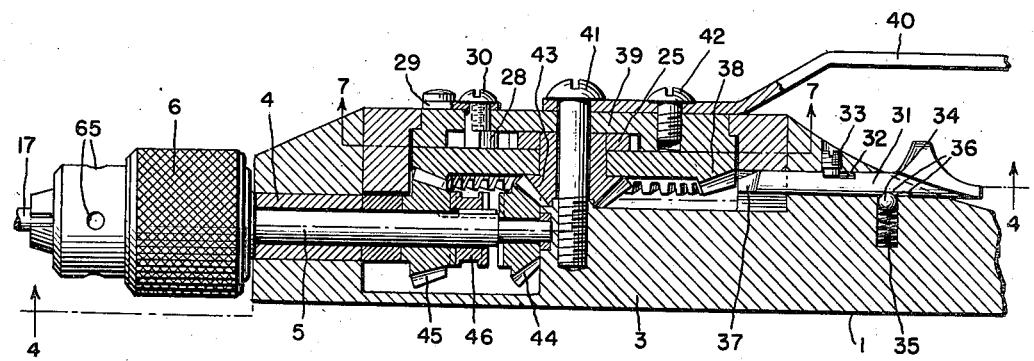
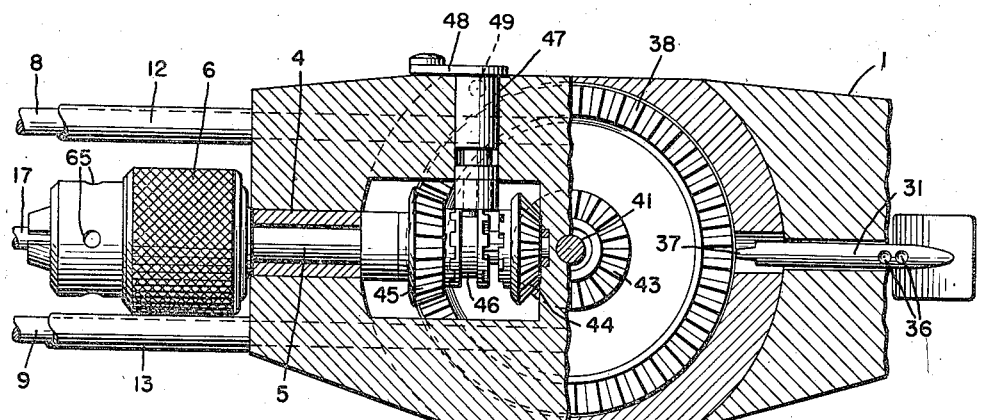
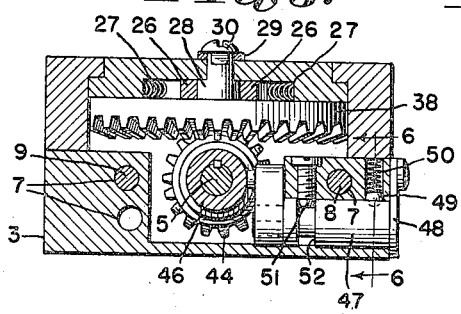
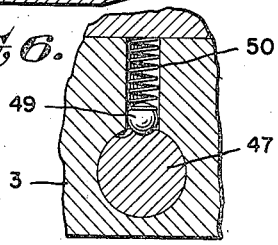
Inventor
J. H. Giesen
By
Attorney April 20, 1948.　　　J. H. GIESEN　　　2,439,803
SURGICAL DRILL
Filed Jan. 19, 1945　　　6 Sheets-Sheet 3

Inventor
J. H. Giesen
By
S. T. Bush
Attorney

April 20, 1948.   J. H. GIESEN   2,439,803
SURGICAL DRILL
Filed Jan. 19, 1945   6 Sheets-Sheet 4
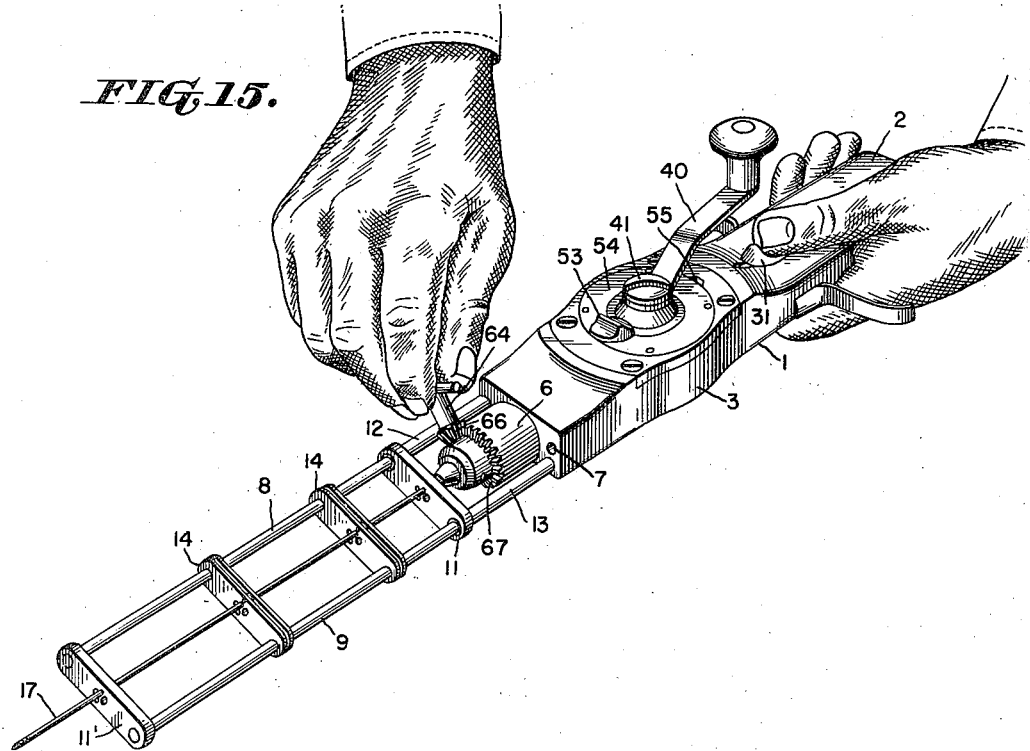
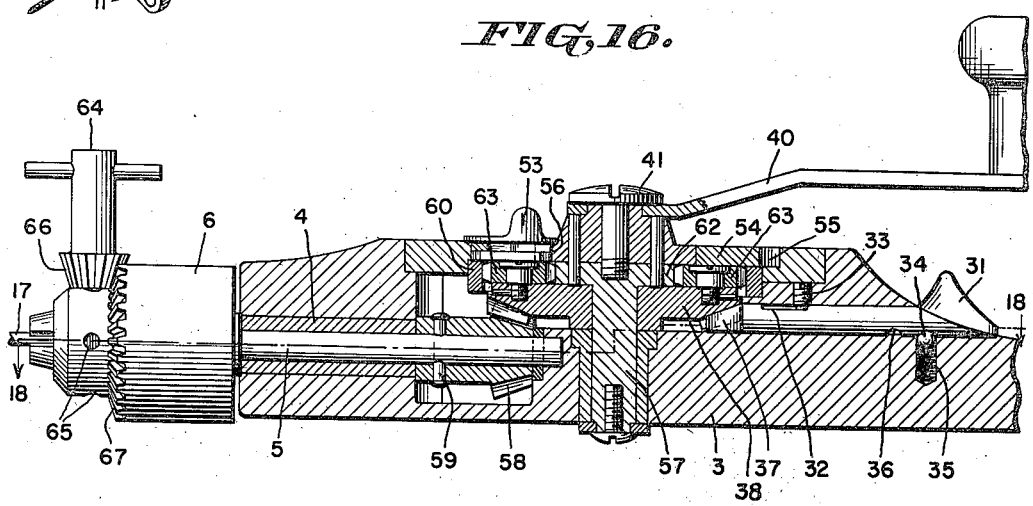
Inventor
J. H. Giesen
By J. E. Bush
Attorney April 20, 1948.                J. H. GIESEN                2,439,803
                              SURGICAL DRILL
                          Filed Jan. 19, 1945        6 Sheets-Sheet 5

Inventor
J. H. Giesen
By
P. E. Bush
Attorney

Inventor
J. H. Giesen

Patented Apr. 20, 1948

2,439,803

UNITED STATES PATENT OFFICE 2,439,803

SURGICAL DRILL

Josef H. Giesen, United States Navy

Application January 19, 1945, Serial No. 573,616

7 Claims. (Cl. 128—310)

(Granted under the act of March 3, 1883, as amended April 30, 1928; 370 O. G. 757)

This invention relates to surgical drills. Difficulties have been experienced in the use of present day surgical drills in that oftentimes it is difficult to tighten the drill chuck sufficiently to prevent slippage in operation. This is due to the lack of a sufficient gripping surface on the chuck, or to the fact that the surgeon usually has wet gloves, with which it is difficult to grasp the chuck tightly. Even where a sufficient grip on the chuck is possible, it has often been difficult to hold the handle of the operating gear from turning when tightening the chuck, because of the high leverage between the chuck and the gear. Ordinarily a 3½ to 1 ratio is used which usually provides sufficient torque on the drill in the drilling operation; but in reverse transmission of the forces, from the chuck to the gear, in which a higher torque on the gear handle is produced by a small turning effort on the chuck, especially with wet gloved hands, is this tightening of chucks made difficult. Further difficulties have been experienced in attempting to guide a long, thin drill or pin during the drilling operation. Furthermore, some types of chucks remain tight as long as the drill is operated in one direction, but upon reversal of direction of operation, they have a tendency to loosen.

The object of this invention is to provide a surgical drill wherein all the above difficulties are eliminated by the novel structure incorporated therein.

A further object is to construct a drill which may be conveniently handled by a surgeon and which has guide holes throughout the length of the body of the drill for mounting adjustable guide means for the drill, so as to accommodate long, thin drills, pins, or wires for insertion into bone structure.

Another object is to provide a drill construction having a chuck and means for effectively tightening it over the inserted drill, and which will hold the drill firmly, once properly tightened, regardless of the direction of operation.

A further object is to construct a surgical drill having change-speed means, locking means and adjustable drill guide means for guiding very thin but long drills, pins, or wires for insertion into bone structure.

Another object is to provide a surgical drill having convenient change-speed means, locking means, and ratchet means for selectively limiting the direction of operation, as well as adjustable guide means for long, thin drills.

Other and more specific objects of this invention will appear in the following detailed description, having reference to the accompanying drawings, wherein:

Fig. 1 is a plan view of one form of the invention shown with the guide means collapsed to substantially its shortest dimension;

Fig. 2 is a side view thereof partly in section;

Fig. 3 is a sectional view taken on the line 3—3 of Fig. 1;

Fig. 4 is a sectional view taken on the line 4—4 of Fig. 3;

Fig. 5 is a cross sectional view taken on the line 5—5 of Fig. 1;

Fig. 6 is a detail sectional view taken on the line 6—6 of Fig. 5;

Fig. 7 is a sectional view taken on the line 7—7 of Fig. 3;

Fig. 8 is a detail view in section of the change-speed mechanism in this form of drill;

Figs. 15 to 25 show various views of another form of this invention with various sectional details to show its operation.

Figure 9:
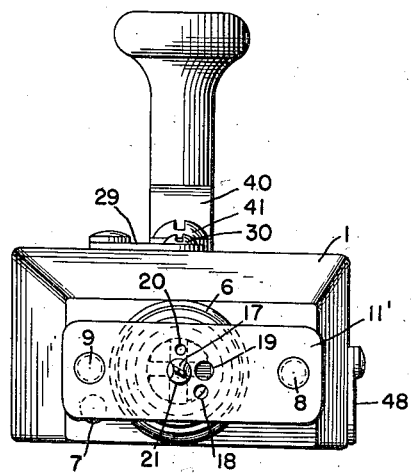
Figs. 9 to 11 are drill end views of the mechanism showing the drill guide in three different positions for accommodation of different sized drills.
Figure 10:
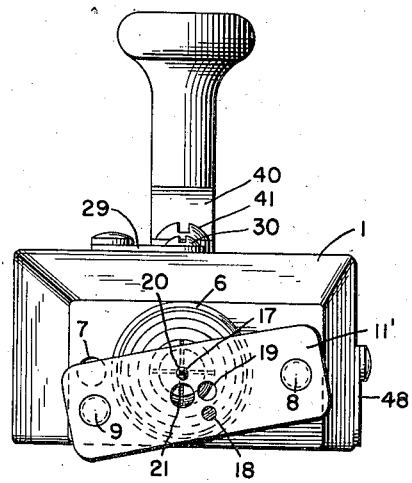
Figure 11:
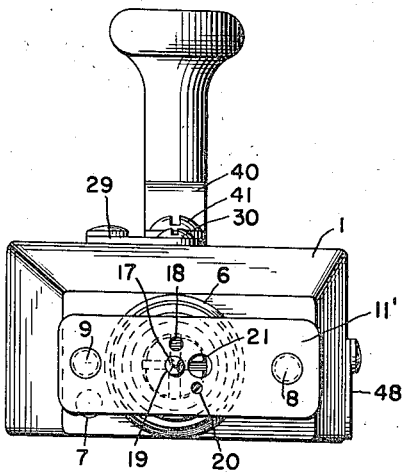
Figure 13:
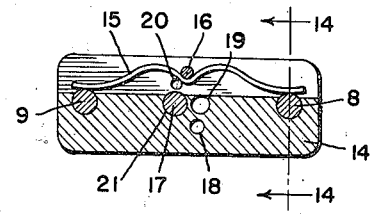
Fig. 13 is a detail sectional view of one of the guide clips.
Figure 14:
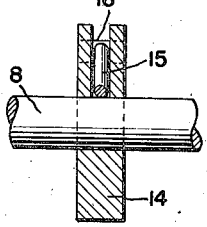
Fig. 14 is a section taken on the line 14—14 of Fig. 13.
Figure 12:
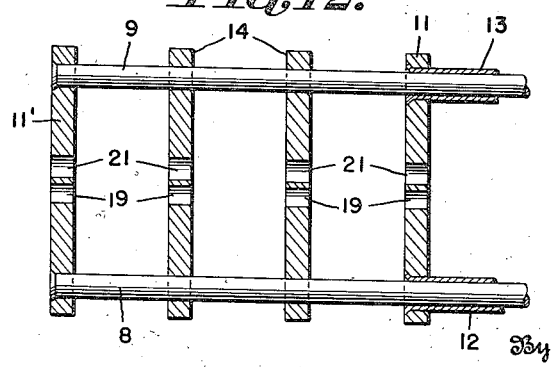
Fig. 12 is a detail sectional view of the guide means.
Figure 17:
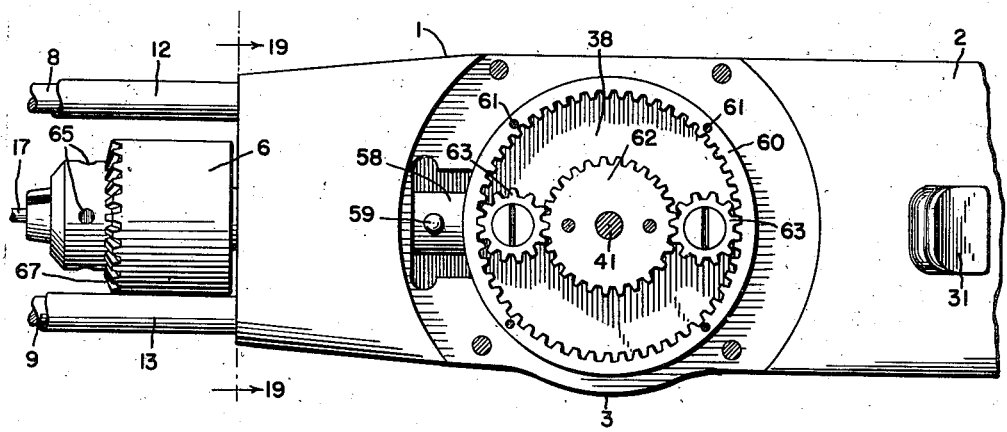
Figure 18:
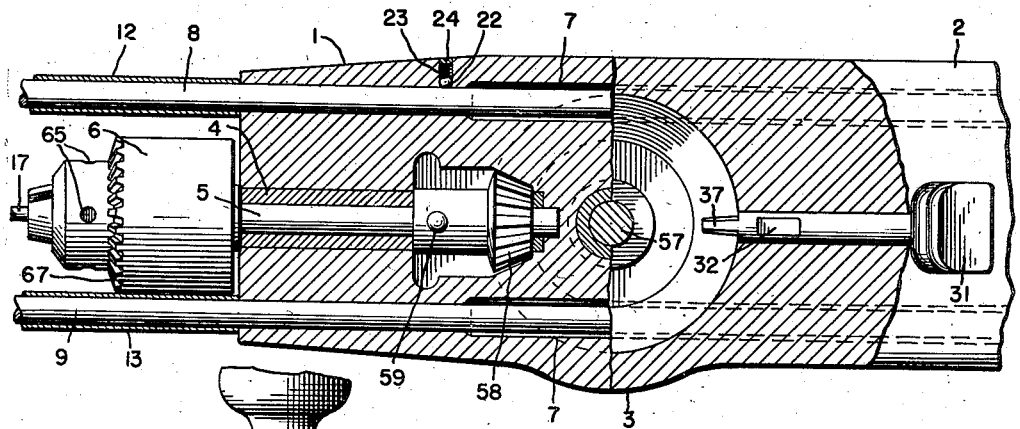
Figure 19:
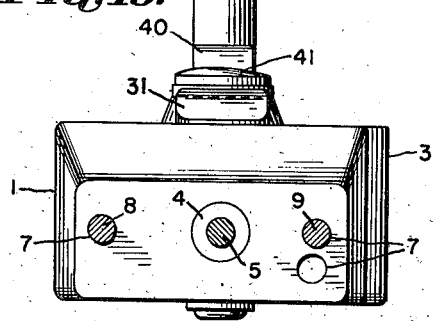
Figure 20:
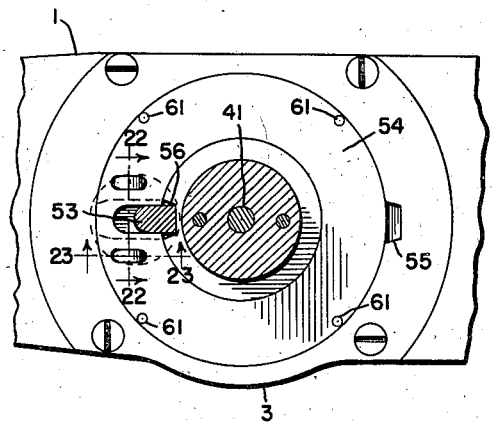
Figure 21:
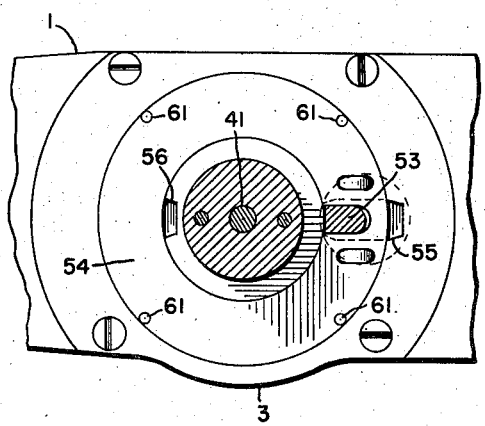
Figure 22:
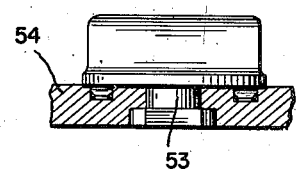
Figure 23:
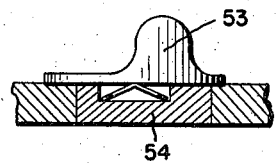
Figure 24:
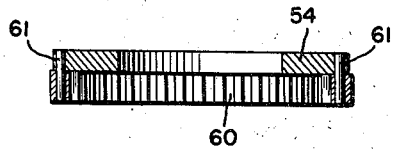
Figure 25:
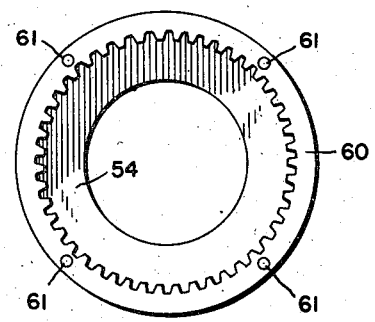

Referring to the several figures, wherein similar parts are designated by the same numerals, the drill illustrated, has an aluminum body or casing 1 with a convenient grip portion 2 at one end, containing the gear mechanism in its middle portion 3, and a bearing 4 at its other end, with a chuck shaft 5 extending therethrough, having a chuck 6 mounted thereon, of the type which will not loosen regardless of the direction of operation. The body has guide holes 7 extending throughout its length for accommodating the two shafts 8 and 9 of the guide means which are slidably inserted therein, and may be adjusted to any position of extension to a maximum distance of approximately six inches from the end of the chuck. The guide means are made up of two portions 10 and 11', telescopically arranged with respect to their shafts. The inner portion 10 has a guide disc 11 at its end, from which two sleeves 12 and 13 extend at right angles thereto. The shafts 8 and 9 of the outer portion 11' slide through these sleeves 12 and 13 and are mounted in the guide holes 7 in the body 1 of the drill. The shafts 8 and 9 are provided with a series of guide clips 14 made up of discs, having a saw-cut splitting one edge thereof, down to the bores through which the shafts 8 and 9 are passed. Each of said saw-cuts receives a spring, such as spring 15 of Fig. 13, held in place by a pin 16, and having its ends resting against the shafts 8 and 9 to furnish sufficient friction for holding the guide clips 14 in any position to which they may be manually adjusted, in accordance with a proper distribution of supports along the length of the drill 17. Each clip 14 has a series of bores 18, 19, 20 and 21 arranged so that the axis of one of them will register with the axis of the drill for each of the four positions that the guide means might assume by placing the shafts 8 and 9 in different relations with respect to the three guide holes 7 provided in the body of the drill. Sizes of drills or pins intermediate the sizes of these guide bores might obviously be accommodated by the next larger size bore in these guide clips.

Two illustrative forms of the invention are shown in the drawings, one form being shown in the Figs. 1 to 14, the other including Figs. 15 to 25. In the first form, the operating lever 40 is pivoted on the central screw 41 and is connected by screw 42 to the ratchet cover 39 in which a cam 28 is rotatably mounted. The cam has a control lever 29 held thereon by screw 30. The ratchet cover also has pivotally mounted thereon a pair of spring-pressed pawls 26, one at each side of the cam 28, so that by operation of the cam by moving lever 29 to one of its two positions, either pawl may be released into an operative position while the other is held inoperative. The ratchet 25, against which the pawls 26 work, is rigidly mounted on the bevel gear unit 38—43. Screw 41, loosely passed through the end of lever 40, the ratchet cover and the gear unit 38—43, is screwed into the body of the drill and forms the pivot for the above elements. The chuck shaft 5 has rotatably mounted on the end thereof, the bevel gear 44 meshing with the bevel gear 43 and the bevel gear 45 meshing with gear 38. A collar 46 is slidably splined on said shaft between gears 44 and 45 for the purpose of connecting the shaft 5 with either of these gears through teeth formed on the ends thereof meshing with complementary teeth on the ends of the gears by sliding the collar axially, in one direction or the other. This is accomplished by the control lever 47 which has a handle 48 accessible from the outside of the drill body. The shaft of this lever has a couple of depressions into which the ball 49 pressed by spring 50 fits, and retains the lever 47 in either one of the two operative positions. A retainer screw 51 having an extension in the guide groove 52 of the shaft of this lever 47 locks the lever in axially aligned position.

A gear lock pin 31, having a tooth 37, slides through the body of the drill and has two positions determined by the depressions 36, into which the spring pressed ball 34 fits, as well as by the groove 32 cut therein, guided by the extension on the screw 33. In the extended position, this pin is inoperative, but when it is pushed into its inner position, the tooth 37 slides into the groove between any two teeth on the bevel gear 38, and thus locks the drill handle against movement, for the purpose of permitting the tightening or loosening of the chuck 6 without causing any difficulty in holding the drill handle, which would be experienced without this lock.

The other form of drill has a different arrangement of gears, in that the change-speed mechanism, instead of being controlled by a lever such as 47 in the first-described form of drill, has the sliding bar 53 mounted in the cover plate 54 which is adaptable to slide into one or the other of two grooves: 55 in the stationary portion of the drill, or 56 in the rotatable handle portion thereof. When the sliding bar is moved into the groove 56 of the movable portion, the gear unit including the bevel gear 38, shaft 57, cover plate 54, and handle 40, rotates and the bevel pinion 58 which meshes with gear 38 is thus rotated and rotates the drill shaft 5 by reason of its being pinned thereto by pin 59. When the sliding bar 53 is moved in the opposite direction and engaged with groove 55 in the stationary portion of the drill, this releases the cover plate 54 from the rotary portion, and since the internal ring gear 60 is rigidly mounted thereon by pins 61, it immobilizes this ring gear. The drive of the drill shaft from the handle 40 is then through the central gear 62, the outer gears 63 and then the bevel gear 38 on which these outer gears 63 are rotatably mounted, and pinion 58. Thus the gear ratio is considerably reduced from the direct drive which is approximately 3¼ to 1 in the illustrated form.

The chucks shown mounted on these two forms of drills are slightly different, but in each case they are of the type, which when tightened over a drill, will not loosen, regardless of the direction of rotation of the drill shaft. The form of chuck shown in Figs. 15 to 19, is the well-known No. 1A Jacobs chuck, and has a tool 64 which fits into the holes 65 around the chuck, and has a pinion gear 66 meshing with the bevel gear 67 for the purpose of tightening or loosening the chuck. The operation of the other form of chuck shown in Figs. 1 to 4, is done by means of a drill shank or any other pin inserted into the holes 65 around the chuck, the walls of which are case hardened so as to prevent deformation due to the force used in tightening or loosening the chuck. The outer surface of this chuck is also corrugated so as to provide a good gripping surface, which may be used in tightening the chuck by hand, without the use of the drill shank or other pin in connection with the holes 65.

Thus, it may be seen that the drills described herein, avoid and eliminate the following defects of standard surgical drills in use at the present time:

(1) Only one size wire or pin can be used in standard drills. In the present drills, any size wire or pin between $\tfrac{1}{16}$ and $\tfrac{3}{16}$ may be used, since a proper sized bore in the guide is available for any of these sizes.

(2) In the standard drill, it is impossible to reverse the action of the drill without the danger of releasing the chuck. In order that screws might be easily withdrawn, as well as inserted, an ideal chuck would be one which would not release upon turning the drill handle counterclockwise. The standard Jacobs chuck incorporated in the present drills fits this requirement very well.

(3) A most annoying rotation of the drill handle occurs upon tightening or releasing the chuck of the standard surgical drill, no matter how small the force used by the surgeon in gripping the drill handle. This is so because of the gear ratio generally at 3 or 4 to 1, as used in most drills, is reversed and, therefore, a most powerful grip upon the drill handle is necessary in order to prevent its rotation when the chuck is being properly tightened or loosened. Such rotation very frequently tears the surgeon's gloves and also traumatizes his hands. In the present drill, locking means are provided for locking the handle against rotation during the chucking operation.

(4) In the drilling operation or insertion of wire or screws, slippage of the chuck is common in standard surgical drills because improper leverage is obtained when the generally moist or wet surgical-gloved hand slides over the chuck in attempting to tighten it. This maneuver often requires the use of pliers or other devices. In the chucks here disclosed, this difficulty is avoided by providing sufficient tightening means with plenty of purchase, so that there is no danger of slippage.

The drill may be constructed of aluminum, preferably with following specifications:

|  | Inches |
|---|---|
| Length | 9 |
| Width | 2 |
| Thickness | 5/8 |

The guide holes in the illustrated forms of the present device, drilled entirely through its length, are of 1/16 inch diameter. The drill is machined in its interior to accommodate a driver gear with handle attached, and pinion gear, and lock mechanism. The driver gear is of 1⅞ inches diameter with a gear ratio of 3¼ to 1. The overall length in collapsed position of the guide is 12 inches, whereas in the extended position, it may be as much as 18 inches or more.

Although only two modifications of the present invention are herein described, it may be made in any other form and dimensions to suit the specific purpose for which it is to be used, without departing from the scope of this invention.

The invention described herein may be manufactured and made by or for the Government of the United States of America for governmental purposes without the payment of any royalties thereon or therefor.

What is claimed is:

1. A surgical drill comprising a body having guide bores throughout the length thereof, a drill shaft, an operating handle, a two-speed gear train operated thereby, and means for changing the speed ratio so arranged within the body of the drill as to clear the guide bores, latch means for locking said gear train against displacement, a chuck mounted on said drill shaft having means for tightening and loosening it over a drill, screw, or pin inserted therein, said chuck being of a type which will not loosen upon reverse operation, and extensible guide means having shafts slidable in said guide bores and provided with guide plates adjustable along the shafts.

2. An extensible guide means for slidably mounting in the body of a drill for guiding a drill, screw, or pin operated by said drill, retaining means in said body for said guide means, to prevent their accidental sliding therein, a series of guide plates adjustable along said guide means for supporting said drill, screw, or pin along its exposed portion during the drilling operation, and a spring clip incorporated in each guide plate for providing friction against said guide means to retain said guide plates in any slidable adjustable position on said guide means.

3. A surgical drill comprising a body having guide bores throughout the length thereof, a drill shaft, an operating handle, a two-speed gear train operated thereby, and means for changing the speed ratio so arranged within the body of the drill as to clear the guide bores, latch means for locking said gear train against displacement, a chuck mounted on said drill shaft having means for tightening and loosening it over a drill, screw or pin inserted therein, said chuck being of a type which will not loosen upon reverse operation, extensible guide means having shafts slidable in said guide bores and provided with guide plates adjustable along the shafts, and a pawl and ratched mounted within said drill body for selectively limiting the direction of operation of said drill.

4. An extensible guide means for slidably mounting in the body of a drill for guiding a drill, screw, or pin operated by said drill, retaining means in said body for said guide means to prevent their accidental sliding therein and a series of guide clips adjustable along said guide means for supporting said drill, screw, or pin along its exposed portion during the drilling operation, wherein the body of the drill has two guide holes extending throughout the length of the body on one side thereof, and equally spaced from a third guide hole similar thereto on the other side of the body at a different distance from the axis of the drill than that of the said two guide holes, said guide means having two shafts slidably fitting into said guide holes and spaced apart the same distance as the guide holes so that the guide means may be applied to two of the three guide holes in four different positions, an end plate fixed at the end of said shafts having a bore lined up with the axis of the drill for each of said four positions, said series of guide clips comprising a series of similar plates slidably mounted on said shafts between said end plate and said drill, having spring clips incorporated therein for providing friction against said shafts to retain them in any suitably adjustable position thereon.

5. An extensible guide means for slidably mounting in the body of a drill for guiding a drill, screw, or pin operated by said drill, retaining means in said body for said guide means to prevent their accidental sliding therein and a series of guide clips adjustable along said guide means for supporting said drill, screw, or pin along its exposed portion during the drilling operation, wherein the body of the drill has two guide holes extending throughout the length of the body on one side thereof, and equally spaced from a third guide hole similar thereto on the other side of the body at a different distance from the axis of the drill than that of the said two guide holes, said guide means having two shafts slidably fitting into said guide holes and spaced apart the same distance as the guide holes so that the guide means may be applied to two of the three guide holes in four different positions, an end plate fixed at the end of said shafts having a bore lined up with the axis of the drill for each of said four positions, said series of guide clips comprising a series of similar plates slidably mounted on said shafts between said end plate and said drill, having spring clips incorporated therein for providing friction against said shafts to retain them in any slidably adjustable position thereon, a second end plate slidably mounted on said shafts and having a pair of sleeves fixed thereto on the drill side and slidable over said shafts, said second end plate thereby serving as a shield limiting the inward motion of said outer end plate and intermediate guide plates.

6. A surgical drill as defined in claim 3, wherein the latch means are conveniently located for operation by the thumb of the hand gripping said drill.

7. A surgical drill comprising a body having a grip portion at one end, a slightly bulged-out mid portion, and a chuck mounted on a shaft extending through the other end thereof, said chuck being of a type which will not loosen upon reverse operation, guide bores extending throughout the length of the body, guide means slidably mounted therein and provided with supports axially adjustable along the guide means for guiding a drill screw or pin mounted in said chuck, an operating handle, a two-speed gear train operated thereby for driving said shaft, and means for locking said gear train comprising a pin guided through the wall of said drill and having an extension slidable into a groove between two teeth of one of the gears in said gear train, and retaining means for resiliently holding said pin in either of its two positions.

JOSEF H. GIESEN.

REFERENCES CITED

The following references are of record in the file of this patent:

UNITED STATES PATENTS

| Number | Name | Date |
| --- | --- | --- |
| 857,151 | Booth | June 18, 1907 |
| 993,829 | Horrocks et al. | May 30, 1911 |
| 1,308,798 | Masland | July 8, 1919 |
| 1,475,153 | Athenas | Nov. 20, 1923 |
| 1,905,851 | Green | Apr. 25, 1933 |
| 2,144,342 | Morrison | Jan. 17, 1939 |
| 2,299,267 | Fisher | Oct. 20, 1942 |

FOREIGN PATENTS

| Number | Country | Date |
| --- | --- | --- |
| 353,706 | Great Britain | July 30, 1931 |